US008125949B1

(12) United States Patent
Dinan et al.

(10) Patent No.: US 8,125,949 B1
(45) Date of Patent: Feb. 28, 2012

(54) DYNAMIC ALLOCATION OF WIMAX RANGING CODES

(75) Inventors: Esmail Dinan, Herndon, VA (US); Vijay Rudraraju, Herndon, VA (US); Howard Anderson, Ashburn, VA (US); Hemanth Balaji Pawar, Herndon, VA (US); Daniel Vivanco, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 873 days.

(21) Appl. No.: 12/124,307

(22) Filed: May 21, 2008

(51) Int. Cl.
*H04W 4/00* (2009.01)
*H04W 36/00* (2009.01)
*H04W 24/00* (2009.01)
*H04J 11/00* (2006.01)

(52) U.S. Cl. ........ 370/329; 370/203; 370/331; 455/436; 455/456.2

(58) Field of Classification Search .................. 370/203, 370/329–332; 455/436, 450, 456.1, 456.2
See application file for complete search history.

(56) References Cited

U.S. PATENT DOCUMENTS

| 2002/0006156 | A1 | 1/2002 | Belaiche |
| 2006/0052103 | A1 | 3/2006 | Mikoshiba et al. |
| 2006/0056359 | A1 | 3/2006 | Franke et al. |
| 2007/0058544 | A1 | 3/2007 | Kim et al. |
| 2007/0060180 | A1* | 3/2007 | Muharemovic et al. ...... 455/509 |
| 2007/0202882 | A1* | 8/2007 | Ju et al. .......................... 455/450 |
| 2008/0056193 | A1* | 3/2008 | Bourlas et al. ................ 370/331 |
| 2008/0112361 | A1* | 5/2008 | Wu .............................. 370/330 |
| 2008/0117887 | A1* | 5/2008 | Joung et al. ................... 370/338 |
| 2009/0176507 | A1* | 7/2009 | Wu et al. ..................... 455/456.2 |
| 2009/0201862 | A1 | 8/2009 | Okker et al. |
| 2009/0285177 | A1* | 11/2009 | Chin et al. .................... 370/331 |
| 2010/0091651 | A1 | 4/2010 | Chin et al. |
| 2010/0290352 | A1 | 11/2010 | Oyman et al. |

OTHER PUBLICATIONS

"Enhanced Ranging in WiMAX," U.S. Appl. No. 12/121,230, filed May 15, 2008.
Altera Corporation, "WiMAX OFDMA Ranging," Application Note 430, Aug. 2006.

* cited by examiner

*Primary Examiner* — Ricky Ngo
*Assistant Examiner* — Paul Masur
(74) *Attorney, Agent, or Firm* — McDonnell Boehnen Hulbert & Berghoff LLP

(57) ABSTRACT

In an exemplary embodiment, a communication system is configured to engage in a plurality of ranging processes, and a pool of ranging codes is available to client devices for requesting the ranging processes. The pool is divided into groups of ranging codes, and each group includes ranging codes allocated for requesting a particular ranging process. The system comprises (a) a receiver that is configured to receive a plurality of requests from one or more client devices, wherein each request comprises a ranging code that is allocated for requesting a particular ranging process and (b) program code stored in data storage and executable by a processor to (i) use the ranging codes from the requests to determine a quantity of requests received, respectively, for each ranging process and (ii) based on the determined quantity of received requests for at least one ranging process, adjust the allocation of the ranging codes.

15 Claims, 8 Drawing Sheets

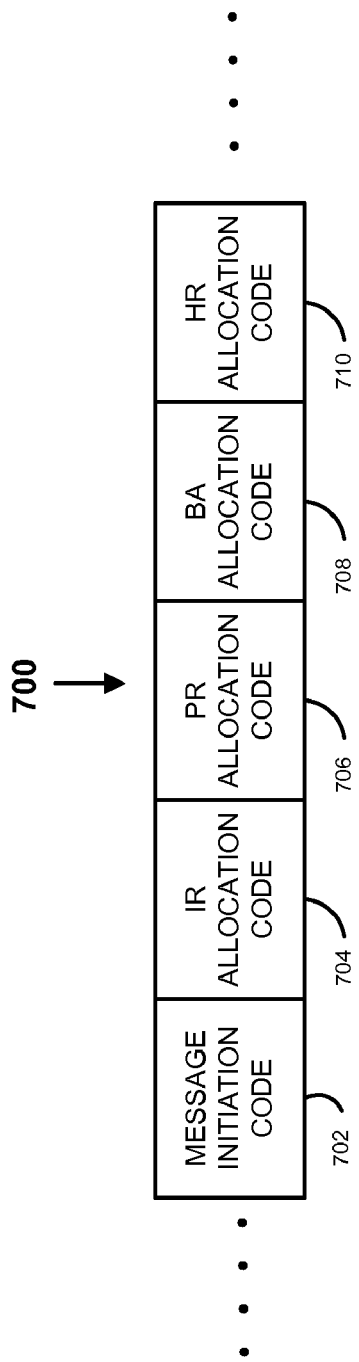

DYNAMIC ALLOCATION OF WIMAX RANGING CODES

RELATED APPLICATION

The co-owned U.S. patent application entitled "Enhanced Ranging in WiMAX" (Dinan et al.), Ser. No. 12/121,230, filed May 15, 2008, is incorporated by reference, in its entirety.

BACKGROUND

The recent introduction of WiMAX technology promises to further increase the proliferation of wirelessly-equipped devices. WiMAX (Worldwide Interoperability for Microwave Access) is an Institute of Electrical and Electronics Engineers (IEEE) standard, designated 802.16, with the 802.16e being the current version of the standard (the terms "IEEE 802.16," "IEEE 802.16e," and "WiMAX" may be used interchangeably herein). WiMAX provides a robust mechanism for wireless communication between base stations and subscriber stations. In particular, WiMAX is designed to provide fixed, portable or non-line-of-sight service with a potential range of 6 miles, a potential bandwidth on the order of 40 megabits per second, and superior quality of service and security.

WiMAX chipsets that provide for communication in accordance with the WiMAX protocol are becoming increasingly prevalent as standard or optional equipment not only in traditional wireless communications devices, such as cellular phones and personal digital assistants, but also in devices that, heretofore, were not used for access to telephony networks. These devices include portable music players, entertainment devices such as game players, automobiles, domestic appliances and so on. It is expected that by the year 2009 there will be in excess of 100 million devices in use that have WiMAX chipsets in them. Thus, a virtual explosion of the number of WiMAX devices is expected to occur in the near future.

In a WiMAX network, users may connect to a WiMAX base station using different timing characteristics and/or power levels. For example, characteristics of a device's connection such as timing, power, and/or transmit frequency offset may be adjusted depending on the location of the user and the user's distance from a base station, as well as other factors. To make such adjustments for a connection, WiMAX defines various ranging processes.

Generally, WiMAX involves four types of ranging processes: initial ranging, periodic ranging, bandwidth requests, and handoff ranging. Initial ranging may be used to make adjustments prior to establishing network connectivity. Periodic ranging may be similar to initial ranging, but occurs after a connection is established, and helps periodically adjust characteristics of the connection (for example, if a user changes location or network conditions change, periodic ranging may be used to update the parameters of the user's connection). A bandwidth request may be sent when a user desires more or less bandwidth. Lastly, handoff ranging requests may help transfer a WiMAX connection from one WiMAX base station to another, so that a user can freely roam between coverage areas of different base stations.

To initiate these ranging processes, a WiMAX device may send ranging requests. According to IEEE 802.16e, there are 256 different ranging codes that can be used for ranging requests. Each of the 256 ranging codes takes the form of a 144-bit Code Division Multiple Access (CDMA) code. Of the 256 ranging codes, 64 are assigned to each ranging process (e.g., 64 initial ranging codes, 64 periodic ranging codes, etc.). Alternatively, some vendors are building chipsets implementing a smaller fixed number of ranging codes for each ranging process. For example, a chipset might allocate 32 ranging codes for handoff ranging requests, 20 ranging codes for bandwidth requests and four codes for both initial and periodic ranging. In any event, with a fixed set of ranging codes available to request each type of ranging process, a base station receiving a ranging request can identify which ranging process is being requested based on the ranging code.

When a WiMAX base station receives a ranging request, the base station may send the client device a ranging response that tells the client device to adjust its power and timing in some manner. After the client device makes the adjustment(s) specified in the ranging response, the client device sends a new initial ranging request to the base station using the adjusted parameters. This back and forth process will continue until the base station is satisfied with the power and timing characteristics for the connection.

Overview

The possibility of millions of WiMAX devices all contending for limited resources in terms of radio access nodes presents acute problems of resource allocation on the network side. Specifically, in the event that all 64 ranging codes allocated for of a particular ranging process are in use, a new request for that ranging process will not reach the base station. As a result, the user sending the request may be unable to engage in the requested ranging process, and thus may be unable to establish a new connection or adjust an existing connection as needed. In this situation, it may be desirable to allocate more than 64 ranging codes to the heavily-used ranging process. Currently, however, WiMAX does not provide for any variance in the allocation of ranging codes among the ranging processes. Rather, the quantity of ranging codes allocated for each ranging process has heretofore been fixed at 64.

Accordingly, a method and system for dynamically managing the allocation of WiMAX ranging codes is disclosed herein. The method may be carried out in a WiMAX communication system that is configured to engage in a plurality of ranging processes, where a pool of ranging codes is available to client devices for requesting the ranging processes. The pool may be subdivided into groups of ranging codes, with each group being respectively allocated for a particular ranging process. The method involves (a) receiving a plurality of requests for ranging processes, wherein each request comprises a ranging code that is allocated for a particular ranging process, (b) using the ranging codes from the received requests as a basis for determining a quantity of received requests, respectively, for each ranging process, and (c) based, at least in part, on the determined quantity of received requests for at least one ranging process, adjusting the allocation of the ranging codes. The method may further involve broadcasting a ranging code allocation message, wherein the ranging code allocation message indicates which ranging codes are assigned to each group of ranging codes. The ranging code allocation message may take the form of a UL-MAP message or a DL-MAP message.

In an exemplary embodiment, adjusting the allocation of ranging codes may involve determining that requests for one ranging process have been received more frequently than requests for another ranging process and responsively allocating additional ranging codes to the group for the more frequently requested ranging process. To do so, ranging codes that were previously allocated for requesting the less frequently requested ranging process may be reallocated to the group for requesting the more frequently requested ranging process.

In another aspect, a WiMAX communication system that is configured to engage in a plurality of ranging processes is disclosed. The system makes a pool of ranging codes available to client devices for requesting the ranging processes. The pool is subdivided into groups of ranging codes, wherein each group is respectively allocated for a particular one of the ranging processes. The system comprises (a) a receiver that is configured to receive a plurality of requests from one or more client devices, wherein each request comprises a ranging code from a group that is allocated for a particular ranging process and (b) program code stored in data storage and executable by a processor to (i) use the ranging codes from the received requests as a basis for to determine a quantity of received requests, respectively, for each ranging process, and (ii) based, at least in part, on the determined quantity of received requests for at least one ranging process, adjust the groups of ranging codes so as to increase the ranging codes in the group allocated for at least one ranging process. The may further comprise a transmitter configured to broadcast a ranging code allocation message, wherein the ranging code allocation message comprises one or more ranging allocation codes, wherein each ranging allocation code indicates for a quantity of ranging codes assigned to a particular one of the groups of ranging codes.

In another aspect, a method for requesting a ranging process from a WiMAX communication system is disclosed. The system may be configured to engage in a plurality of ranging processes, and may make a pool of ranging codes available for requesting the ranging processes. The pool is divided into groups of ranging codes, wherein each group is respectively allocated for requesting a particular ranging process. The method comprises (a) receiving a ranging code allocation message from the WiMAX communication system, wherein the ranging code allocation message comprises a quantity of ranging codes allocated to each of one or more of the groups of ranging codes, (b) selecting a ranging process to be requested, (c) using at least one quantity from the ranging code allocation message as a basis for selecting a ranging code that is allocated for the selected ranging process, and (c) sending a ranging request to the WiMAX communication system, wherein the ranging request comprises the selected ranging code.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 7 is a simplified block diagram illustrating a ranging code allocation message according to an exemplary embodiment.

DETAILED DESCRIPTION

Disclosed herein is a method and system for managing the allocation of WiMAX ranging codes. The method and system are described by way of example, with reference to the current WiMAX ranging processes (initial ranging, periodic ranging, bandwidth ranging, and handoff ranging). It should be understood, however, that the invention may extend to include other types of ranging processes, and systems implementing varying combinations of ranging processes.

In an exemplary embodiment, 64 ranging codes from the pool of 256 WiMAX ranging codes may initially be available to client devices for requesting each ranging process. However, based on a history of ranging requests, a WiMAX communication system may dynamically adjust the allocation of ranging codes for requesting each ranging process. For example, in situations where a certain ranging process is being requested more frequently than others, a WiMAX base station may allocate additional ranging codes for requesting the more frequently requested process.

Figure 1:
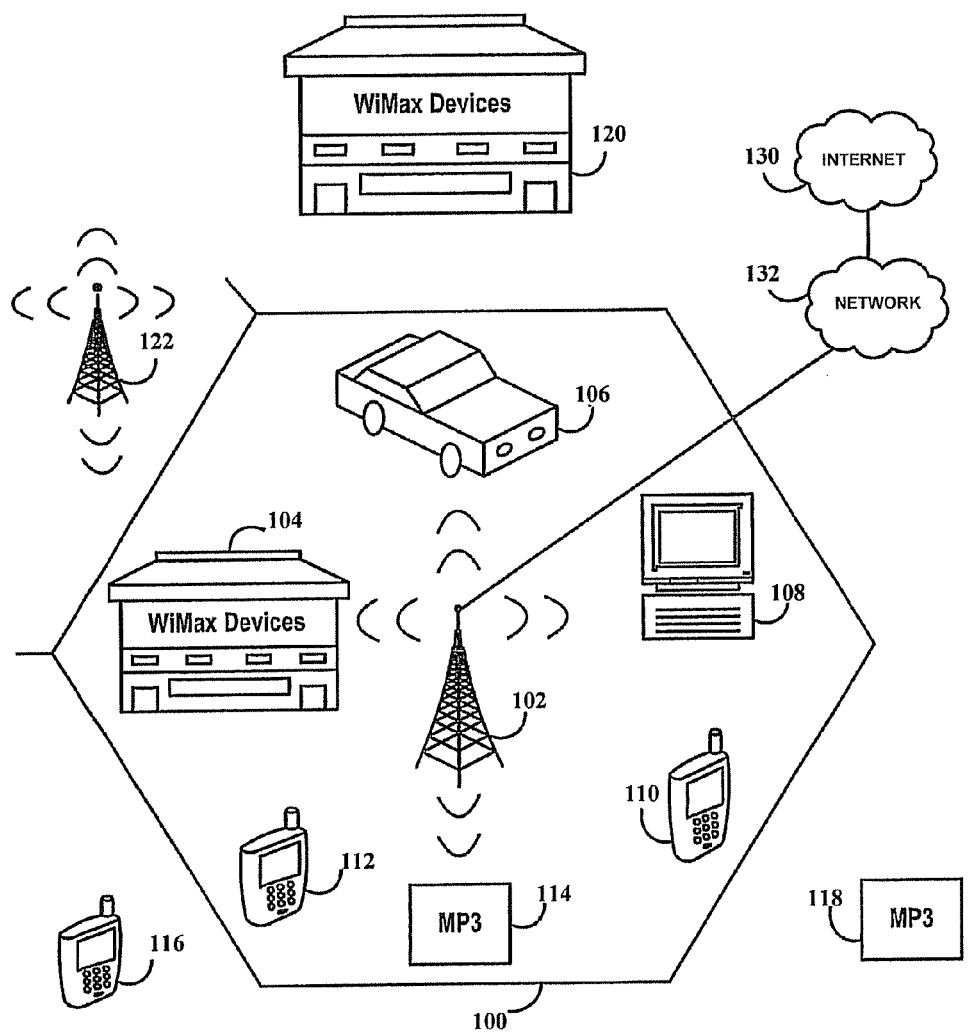
FIG. 1 is schematic representation of a coverage area 100 where service is available from a WiMAX base station according to an exemplary embodiment.

FIG. 1 is schematic representation of a coverage area 100 where service is available from a WiMAX base station 102. Also shown is a plurality of WiMAX client devices that may compete for ranging resources of the WiMAX base station 102. The client devices may take the form of, for example, WiMAX devices located in a building or home 104, such as computer, appliance or cell phone, WiMAX devices located in an automobile 106, a portable computer 108, a cellular telephone 110, a personal digital assistant 112, an MP3 player 114, another cell phone 116, another MP3 player 118 and/or various WiMAX devices located within an office building 120 such as computers, cell phones, game players, etc. Adjacent areas may be covered by other base stations, one of which is shown as base station 122. WiMAX base station 102 is coupled to a network 132, which is coupled to internet 130.

Figure 2:
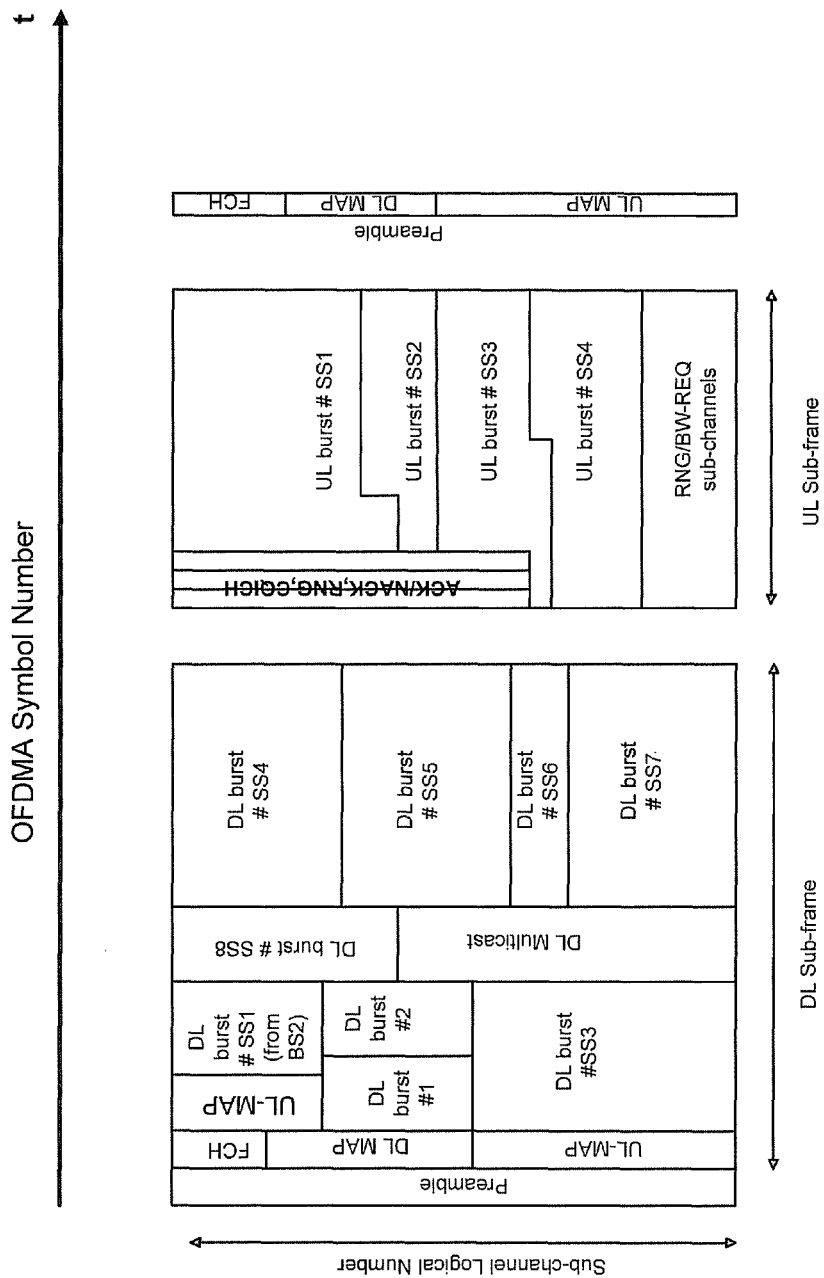
FIG. 2 is a diagram illustrating a WiMAX data frame according to an exemplary embodiment.

In WiMAX, a frame format, the structure of which is illustrated in FIG. 2, may be used for data communications between a client device and a WiMAX base station 102. Each frame includes a downlink (DL) sub-frame and an uplink (UL) sub-frame, which provide various channels and zones for communicating different types of data. For example, in the DL sub-frame, a base station typically broadcasts a preamble, an uplink map (UL-MAP) message, a downlink map (DL-MAP) message, a Frame Control Header (FCH), and various DL burst messages, among others. Some messages in the DL sub-frame, such as the preamble, UL-MAP, and DL-MAP may be available to any client device within range of the transmitting base station. On the other hand, some parts of the DL sub-frame, such as DL burst messages, may be intended for specific client devices.

Viewing the DL sub-frame in greater detail, the preamble is typically the first OFDM symbol in each WiMAX frame and may be used by a client device for synchronization with a base station. Following the preamble is the FCH, which may provide frame configuration information. For example, the FCH may indicate the length of the UL-MAP message and/or the DL-MAP message, the coding scheme to be used, and/or which sub-channels are useable. The UL-MAP and DL-MAP messages may provide sub-channel allocation, as well as other control information for the UL sub-frame and DL sub-frame, respectively. For instance, a base station may determine the number of time slots that each client device will be allocated in the UL sub-frame, and include this information in the UL-MAP at the beginning of each frame. Aspects of the WiMAX frame structure, including aspects not described herein such as the Sub-channel Logical Number message, the DL Multicast message, the ACK/NACK messages, the RNG message, the CQICH message, the UL bursts, and the RNG/BW-REQ sub-channels, are set forth in greater detail in the 802.16 standard and extensions.

When a client device equipped with a WiMAX chipset (such as devices 104-120) powers on, it typically engages in an initial system acquisition step to set up a connection. In the system acquisition step, the device looks at a particular frequency, in search of a preamble. Once the client device finds the preamble, it has found a WiMAX base station 102 and may attempt to establish a connection with the base station by engaging in the initial ranging with the base station.

Figure 3:
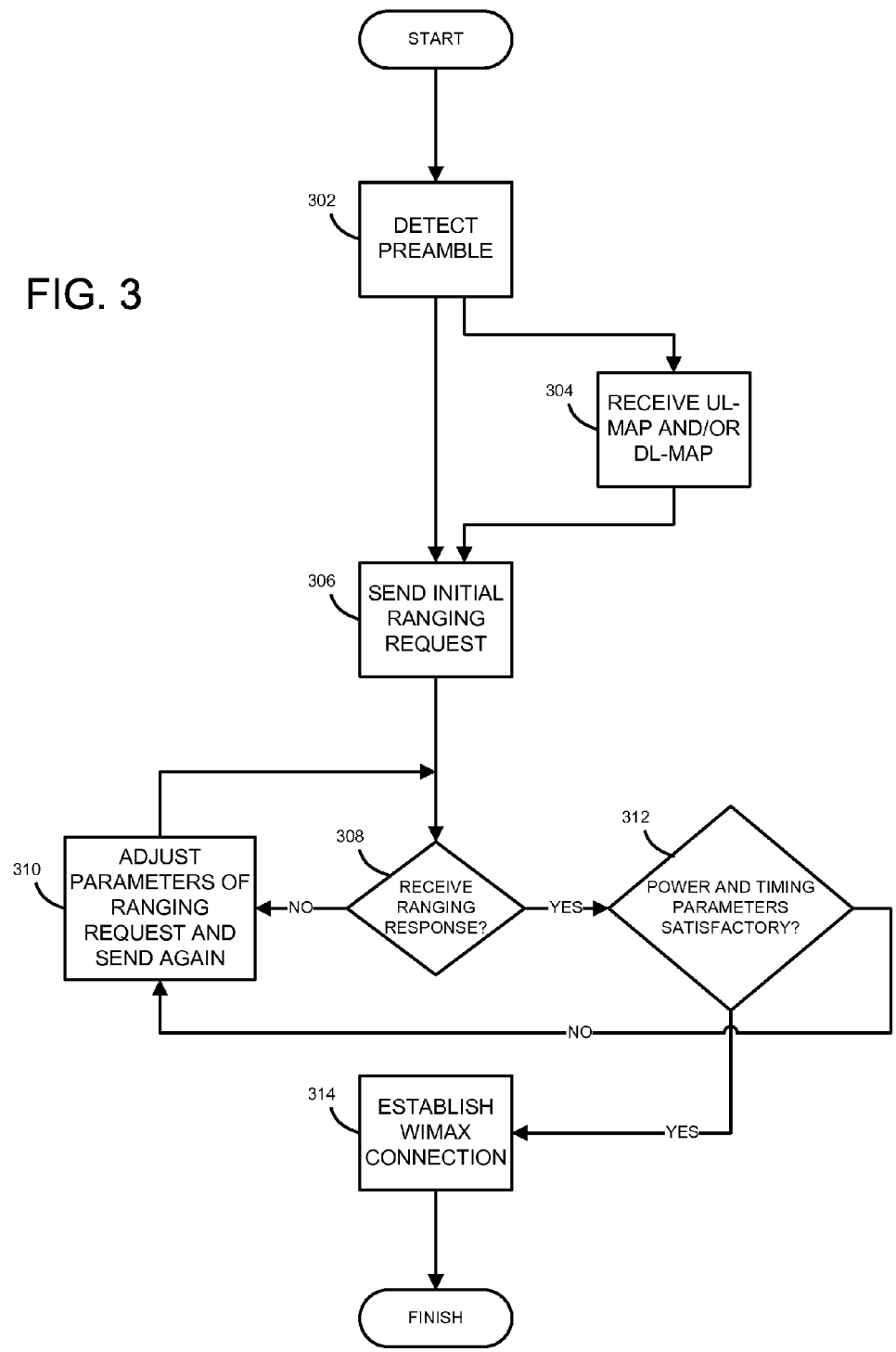
FIG. 3 is a simplified flow chart illustrating the initial ranging process in WiMAX according to an exemplary embodiment.

FIG. 3 is a simplified flow chart illustrating the initial ranging process in WiMAX. Initially, the client device detects the preamble, which indicates that WiMAX service may be available from the base station, as shown by block 302. At or near that time, the client device may also detect and receive the DL-MAP and/or UL-MAP from the same base station, as shown by block 304. Once the client device detects the preamble from a base station, the client device may send an initial ranging request to that base station, as shown by block 306. The next step depends on whether or not a ranging response is received, as illustrated by block 308. If no ranging response is received, the client device may adjust parameters of the initial ranging request, and send an initial ranging request with the adjusted parameters to the BTS, as shown by block 310. Generally, as long as no ranging response is received, the client device may continue to send initial ranging requests, increasing the power level and/or selecting a different initial ranging code in the successive requests, until a ranging response is received from the base station. Further, the client device may wait for an exponential backoff time or for another predetermined period of time between ranging requests.

Client devices typically send ranging requests via ranging sub-channels, which may be part of the UL sub-frame. In the case of an initial ranging request, the request is sent via an initial ranging (IR) subchannel in the UL sub-frame. IR sub-channels are contention-based subchannels, meaning that multiple client devices may use the same IR subchannel at the same time for initial ranging. To send an initial ranging request, a client device may transmit an initial ranging request over an IR subchannel for a two-symbol duration. Specifically, a WiMAX device selects one of the ranging codes allocated for initial ranging requests and sends a ranging request including the initial ranging code to the WiMAX base station. According to WiMAX, the initial ranging code is selected at random from the 64 ranging codes designated for initial ranging.

When the base station receives the ranging request, the base station may send a ranging response to the client device. The response may indicate either that the power and timing parameters are satisfactory, or that the parameters should be adjusted, as shown by block 312. If the parameters should be adjusted, the client device adjusts accordingly, as shown by block 310. This back and forth process will continue until the base station is satisfied with the parameters of the connection (e.g., that the client device is assigned the appropriate sub-channel, with the appropriate power and timing characteristics, etc.), at which point the base station may send a ranging response that includes a specific frequency, a specific bandwidth, a specific timeslot, and/or specific coding for the client device to use. This establishes a dedicated subchannel between the base station and the device. The client device can then proceed to establish a connection with the base station, as shown by block 314.

More specifically, after establishing a dedicated sub-channel, the WiMAX device sends a response/ack message back to the base station. At this point, the device has not yet registered with the network, e.g., undergone authentication or higher application levels in the OSI reference model. Rather, the initial ranging process establishes the OSI Layer 1 (RF) settings for communication. After the initial ranging is completed, the device enters a session establishment step. This step occurs at Layer 2 of the OSI reference model and higher levels. This could involve the device registering with the network, registering with application servers, services, etc. These steps are fully described in the WiMAX standard and not discussed in detail herein.

Returning to block 304, the client device may detect the UL-MAP or DL-MAP before sending an initial ranging request. The UL-MAP and DL-MAP typically include information that is used once a connection is established (i.e., to describe the uplink and downlink subframes). Thus, WiMAX devices may not process the DL-MAP or UL-MAP before sending an initial ranging request, as illustrated by the fact that block 304 may be bypassed. In an exemplary method, however, the UL-MAP or DL-MAP may include headers that indicate the quantity of ranging codes that are available to request each type of ranging process. Accordingly, before sending a ranging request, a device may look to the UL-MAP to determine the quantity of ranging codes available for initial ranging.

Figure 4:
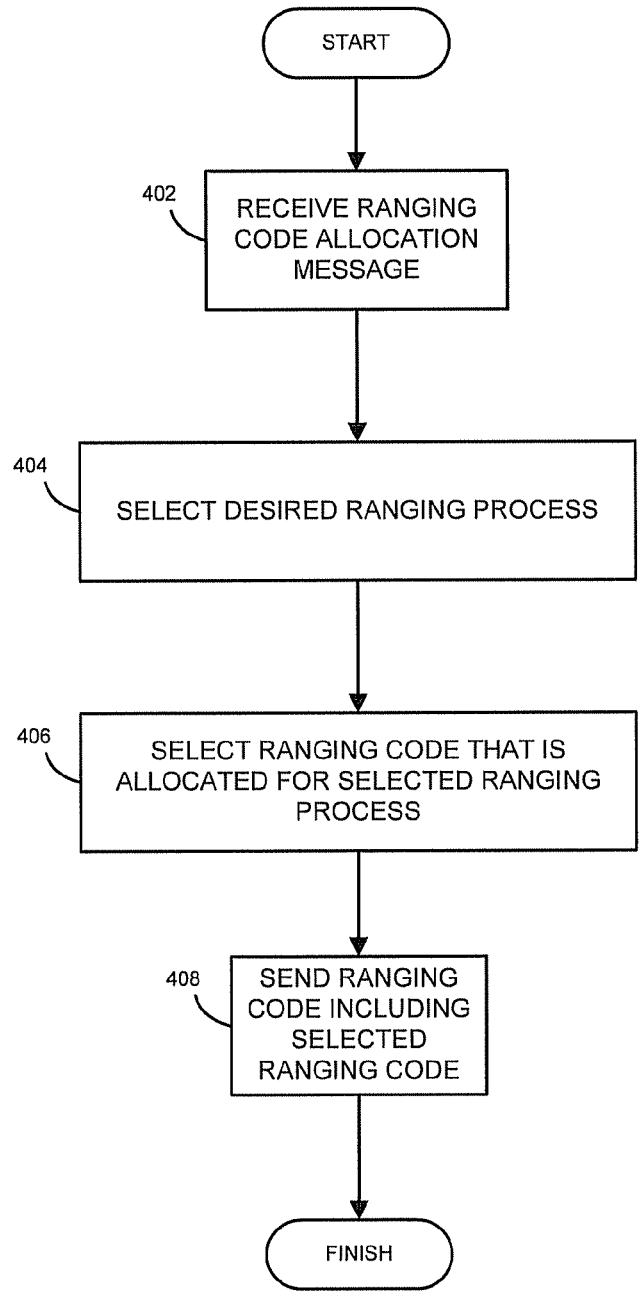
FIG. 4 is a flow chart illustrating a method for requesting a ranging process according to an exemplary embodiment.

FIG. 4 is a flow chart illustrating a method for requesting a ranging process from a WiMAX communication system that is configured to engage in a plurality of ranging processes. In the method, a pool of ranging codes is available for requesting the ranging processes from the WiMAX communication system. The pool is divided into groups of ranging codes, with each group being designated for requesting a particular ranging process. The method is described by way of example, with a client device carrying out the method. However, it should be understood that other entities may perform the method or steps of the method instead of or in conjunction with a client device.

The method involves the client device receiving a ranging code allocation message from the WiMAX communication system, as shown by block 402. The ranging code allocation message indicates a quantity (i.e., how many) ranging codes from the pool are allocated to at least one of the groups. Next, the client device selects a ranging process that the client device desires to engage in, as shown by block 404. This selection may occur when user starts or changes their use of a client device in a manner that requires or might benefit from ranging, or may occur for any other reason that a client device typically engages in ranging. The device then uses the allocation specified by the ranging code allocation message as a basis for selecting a ranging code that is allocated for the selected ranging process, as shown by block 406. The device then sends a ranging request, including the selected ranging code, to the WiMAX communication system, as shown by block 408.

To assist in this process, the ranging codes may be arranged in a continuum or predefined sequence, and an order of the ranging code groups may also be defined. For example, in an exemplary embodiment, the ranging codes have an intrinsic order (e.g., 1 to 256) and the groups also have a defined order (e.g., initial ranging, then periodic ranging, then bandwidth adjustment, and finally handoff ranging). Therefore, if the ranging codes are initially allocated so that each group includes 64 of the 256 WiMAX ranging codes, the client device can be programmed to recognize that the first 64 ranging codes are allocated for initial ranging, the next 64 ranging codes are allocated for periodic ranging, and so on. Further, the order of groups may be maintained even after adjusting the allocation of the ranging codes. For example, the base station may allocate 128 ranging codes for initial ranging, 64 ranging codes for periodic ranging, 32 ranging codes for bandwidth adjustment, and 32 ranging codes for handoff ranging. Since the ranging codes are grouped in a defined order, the client device can be programmed to recognize that the first 128 ranging codes are allocated for initial ranging, the following 64 ranging codes are allocated for periodic ranging, and so on.

Therefore, when the order of the groups is defined, a client device receiving a message that specifies how many ranging codes are allocated for a particular ranging process can determine precisely which ranging codes are allocated for that ranging process. Accordingly, a ranging code allocation message may simply indicate a number of ranging codes that are allocated for each ranging process. And although it may do so, the message need not identify each individual ranging code as being allocated for a particular ranging process. Once a client device knows the group of ranging codes that are allocated for a desired ranging process, the client device may select a ranging code from that group at random. This random selection is similar to the selection of a ranging code specified by the WiMAX standard, but the client device now takes into consideration that the size of a group for a particular ranging process may vary over time.

Figure 5:
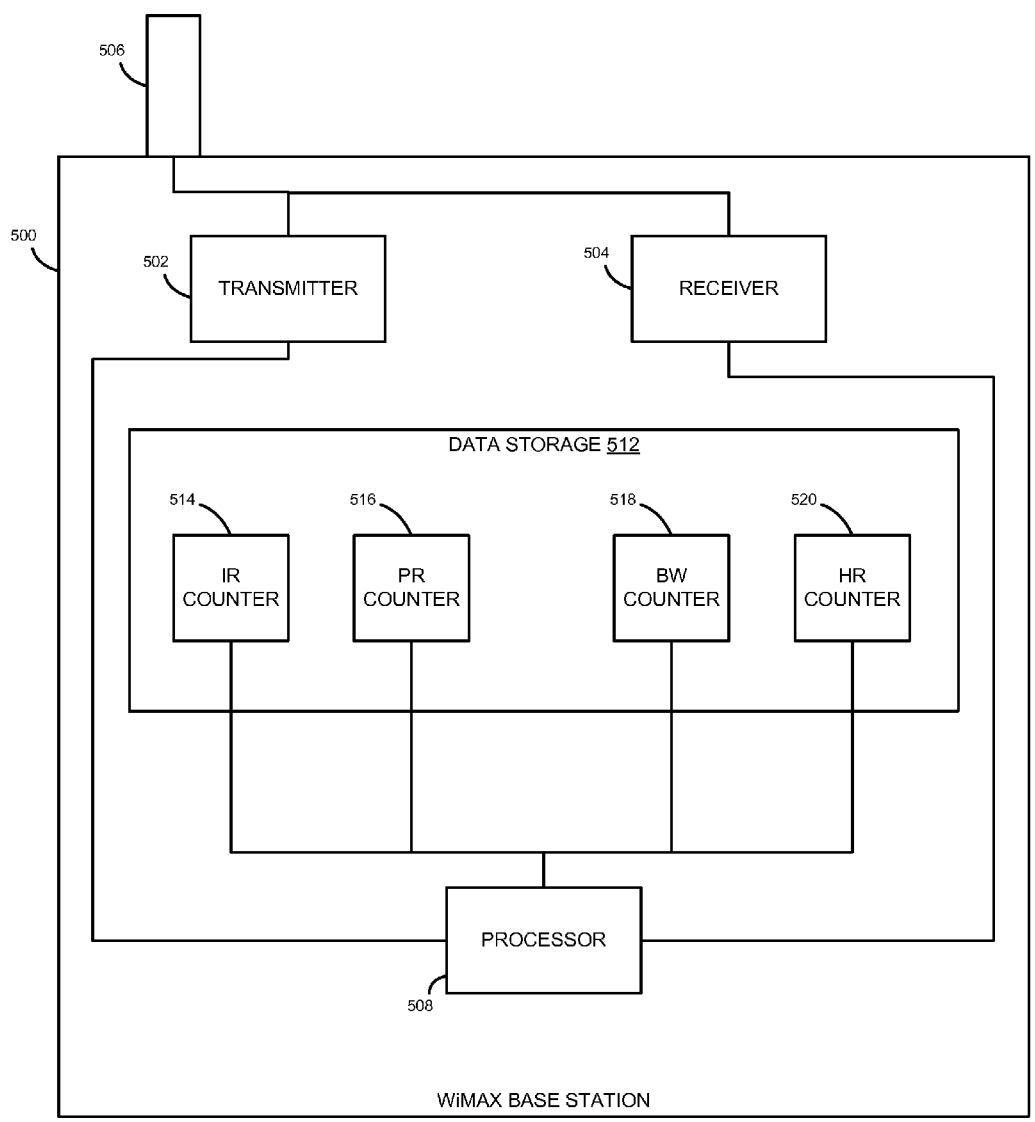
FIG. 5 is a block diagram depicting a WiMAX base station according to an exemplary embodiment.

FIG. 5 is a block diagram depicting a WiMAX base station 500 according to an exemplary embodiment. Base station 500 includes a transmitter 502 and a receiver 504, which are coupled to an antenna 506. While transmitter 502 and receiver 504 are shown as separate entities they may be combined as a single entity. The transmitter 502 and receiver 504 are also coupled to a processor 508. The processor 508 is configured to write data to and/or read data from data storage 512. Specifically, to provide the functionality described herein, processor 508 may be configured to execute program code stored in data storage 512.

Receiver 504 operates to receive ranging requests from client devices. When a ranging request is received, the base station uses the ranging code included in the request to determine which ranging process is being requested. In particular, base station 500 may maintain ranging process counters for each ranging process in data storage 512. In the depicted example, the base station maintains an initial ranging counter 514, a periodic ranging counter 516, a bandwidth adjustment counter 518, and a handoff ranging counter 520. Thus, as each ranging request is received, base station 500 determines if the request is for initial ranging, periodic ranging, bandwidth adjustment, or for handoff ranging and increments the counter corresponding to the requested ranging process.

Base station 500 is configured to allocate the pool of 256 WiMAX ranging codes among ranging code groups. Each ranging code group corresponds to a particular ranging process. Thus, in an exemplary embodiment, one group may be used for initial ranging, another group for periodic ranging, etc. Initially, 64 of the ranging codes may be allocated for each type of ranging process. However, the base station is configured to use the history of ranging requests, as indicated by counters 514-520, to adjust the allocation of, or re-allocate, the ranging codes. The specific adjustment to the allocation (e.g., how many codes are allocated for each ranging process), and when reallocation occurs, may vary. Generally, ranging codes may be redistributed so that more ranging codes are allocated for more frequently requested ranging processes, although other factors may also be considered.

It should be understood that the frequency with which each ranging process is requested from a given base station may change over time. For instance, in a highway traffic jam, where cars move slowly, initial and periodic ranging requests may be received more frequently than handoff ranging requests. However, at the same location on the highway, at a time when traffic is moving at full speed, cars will be moving in and out of the area more rapidly. At this time, handoff requests may occur much more frequently than periodic ranging requests, and thus, more ranging codes may be allocated for handoff ranging requests than for other ranging processes.

As another example, a base station or base stations may provide service in a coverage area that includes a stadium. During sporting events, when a large number of users watching the game remain stationary, requests for initial ranging, periodic ranging and/or bandwidth adjustment may be received far more frequently than requests for handoff ranging. As such, many or even all of the ranging codes allocated for handoff ranging may be re-allocated for initial ranging, periodic ranging and/or bandwidth adjustment. Many other examples are also possible.

Since the request patterns at a given location may change over time, ranging process counters 514-520 may be reset from time-to-time. For example, counters 514-520 may be reset every 15-30 minutes during times of high traffic, but only every hour during times of low traffic. Alternatively, the counters may not be reset at all. Generally, the frequency at which counters 514-520 are reset (if they are reset at all) is a matter of engineering design choice.

Base station 500 may also be configured to broadcast ranging code allocation messages. In particular, transmitter 502 may broadcast ranging code allocation messages via antenna 506. The ranging code allocation message may indicate how many ranging codes from the pool are allocated for each ranging process. A ranging code allocation message may be broadcast periodically, or whenever ranging codes are redistributed. Further, the ranging code allocation message may take the form of a UL-MAP or DL-MAP message, which can be detected and/or received by any client device operating in the coverage area of base station 500.

Figure 6A:
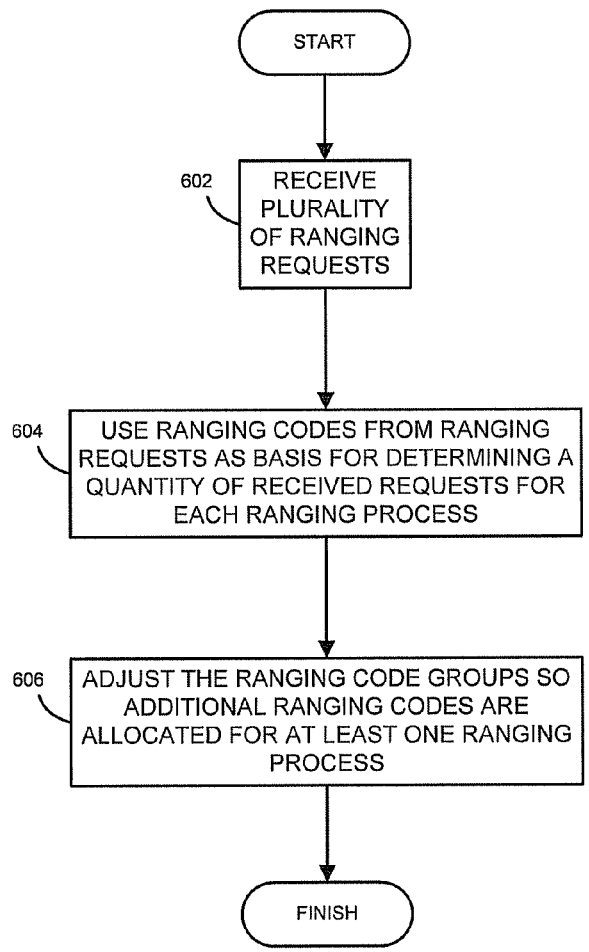
FIG. 6A is a flow chart illustrating a method for managing the allocation of WiMAX ranging codes according to an exemplary embodiment.

FIG. 6A is a flow chart illustrating a method for managing the allocation of WiMAX ranging codes. The method may be carried out in a WiMAX communication system that is configured to engage in a plurality of ranging processes. In the system, a pool of ranging codes is available to client devices for requesting for the ranging processes. This pool is divided into groups of ranging codes, with each group being allocated for requesting one of the ranging processes. In an exemplary embodiment, the method may be carried out by a WiMAX base station and may be used by the base station to dynamically adjust the quantity of ranging codes allocated for each particular ranging process. Therefore, the method is generally described herein by way of example, with reference to a base station carrying out the method. It should be understood, however, that other entities or combinations of entities may provide the functionality described herein.

In an exemplary embodiment, the method involves a base station receiving a plurality of ranging requests, as shown in block 602. Each ranging request includes a ranging code that is designated for requesting one of the ranging processes. The base station then uses the ranging codes from the received ranging requests to determine a quantity of requests that have been received for each ranging processes, as shown by block 604. Specifically, the base station may track how many requests have been received for each ranging process over a predetermined period of time (i.e., the frequency with which requests for each ranging process are received).

The base station may periodically reset its counters, so that it can restart the count for each ranging process. For example, the counters may be reset at the end of the predetermined period of time, or after the predetermined number of ranging requests have been received. Alternatively, a base station may keep a "running" total, which never resets. As another alternative, the base station may actually store an indicator of the ranging process requested in each received request, such as the ranging code included in the request, and then later, based on the stored indicators, calculate the frequency with which each ranging process is requested.

Once the base station determines the frequency with which each ranging process is being requested, the base station may adjust the ranging code groups so that additional ranging codes are allocated for requesting at least one ranging process, as shown by block 606. Adjusting the groups may involve comparing the total number or frequency of received requests for two or more ranging processes, and in particular, determining that one ranging process has been requested more frequently than at least one other ranging process. The base station may then redistribute the ranging codes accordingly, adding ranging codes to the group corresponding to the more frequently requested ranging process, as shown in block 408. Specifically, a predetermined number of ranging codes may be removed from a group corresponding to less frequently requested ranging process, and those ranging codes may be added to the group for the more frequently requested ranging process.

It should be understood that adjusting the allocation of the ranging codes among the ranging processes may involve moving ranging codes between more than two groups of ranging codes. As an example, ranging codes may be removed from two or more groups and added to a single group. And as yet another example, ranging codes may be removed from a single group, split up, and added to two or more other groups. Other examples are also possible.

Figure 6B:
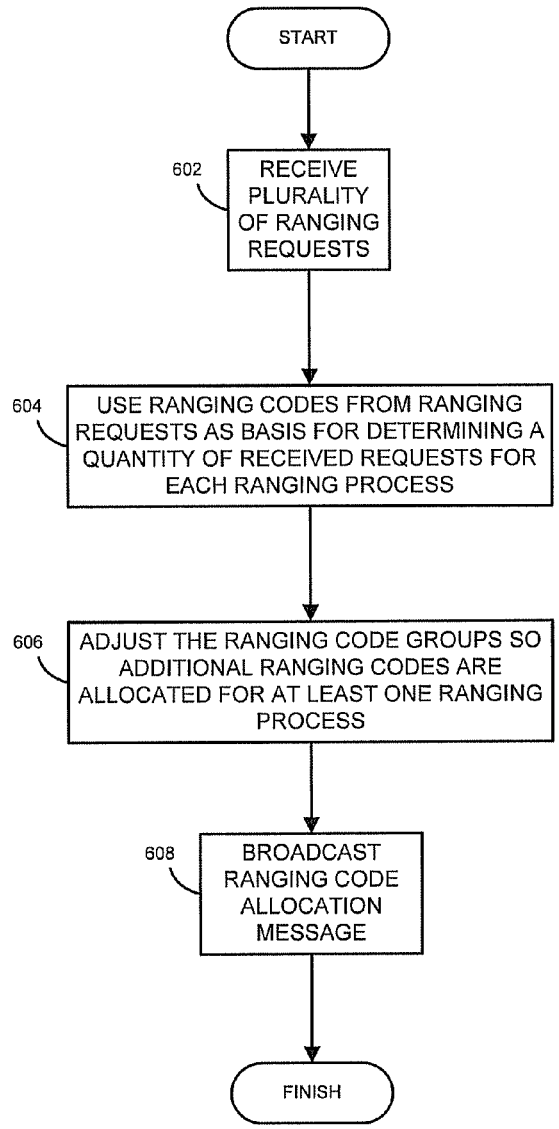
FIG. 6B is a flow chart illustrating a method for managing the allocation of WiMAX ranging codes according to an exemplary embodiment.

FIG. 6B is another flow chart illustrating a method for managing the allocation of WiMAX ranging codes. Blocks 602-606 in FIG. 6B are the same as those in FIG. 6A. FIG. 6B, however, further involves broadcasting a ranging code allocation message, as shown by block 608. The ranging code allocation message may include one or more allocation codes, each allocation code indicating a quantity of ranging codes that are allocated for requesting a particular ranging process.

FIG. 7 is a simplified block diagram illustrating a ranging code allocation message 700. Ranging code allocation message 700 may take the form of a UL-MAP or DL-MAP message, or a section of a UL-MAP or DL-MAP message, although other forms are also possible. Ranging code allocation message 700 includes a message initiation code 702, which identifies the beginning of the ranging code allocation message. Ranging code allocation message 700 also includes allocation codes 704-710. In an exemplary embodiment, ranging code allocation message 700 includes an allocation code for each ranging process. Therefore, ranging code allocation message 700 include an initial ranging (IR) allocation code 704, a periodic ranging (PR) allocation code 706, a bandwidth adjustment (BA) allocation code 708, and a handoff ranging (HR) allocation code 710.

Allocation codes 704-710 may take the form of 2-bit symbols, which indicate a quantity of ranging codes allocated to request each ranging process. For example, the allocation codes 00, 01, 10, and 11 may indicate that 16, 32, 64, or 128 ranging codes, respectively, are allocated for a particular ranging process. Further, in the ranging code allocation message 700, the allocation codes may be arranged in a predetermined order. A client device receiving this message may then recognize which allocation code is which, based on the order. For instance, the allocation codes may always appear in the order shown in ranging code allocation message 700 (first initial ranging, then periodic ranging, then bandwidth adjustment, and finally handoff ranging). Thus, a base station could broadcast a ranging code allocation message as follows:

| 11 | 11 | 10 | 01 | 01 |
|----|----|----|----|----|

Following the message initiation code (in this case, "11"), this message indicates that the group of ranging codes for initial ranging includes 128 codes, the group for periodic ranging includes 64 codes, the group for bandwidth adjustment includes 32 codes, and the group for handoff ranging includes 32 codes.

It should be understood that the size of allocation codes may vary. For instance, the size may be increased to provide more granular adjustments to the ranging code groups. As an example, using 3-bit allocation codes—000, 001 . . . 111—eight different sizes may be represented by the allocation codes, as opposed to 2-bit allocation codes, which represent only four sizes. Other examples are also possible.

The method and system described herein may be used in conjunction with the method and system described in "QoS Differentiated WiMAX Ranging," which discloses using orthogonal variable spreading factor ranging codes to provide varying quality-of-service (QoS) to different customers. As such, base stations may be configured to broadcast a QoS level message as described in the co-owned Application, as well as a ranging code allocation message. In an exemplary embodiment, both the QoS level message and the ranging code allocation message may be broadcast via a UL-MAP message and/or a DL-MAP message. Moreover, a base station may allocate ranging codes among the ranging processes based, at least in part, on the frequency with which requests for a particular QoS level are received. For example, if a certain number of initial ranging requests are received from gold level (i.e., high QoS) customers, the base station may allocate more ranging codes for initial ranging. This may be the case even if, overall, more ranging requests have been received for handoff ranging than for initial ranging, and, even if the base station would otherwise allocate more ranging codes for handoff ranging. Many other examples are also possible.

Example embodiments of the present invention have been described above. Those skilled in the art will understand, however, that changes and modifications may be made to these embodiments without departing from the true scope and spirit of the invention, which is defined by the claims.

We claim:

1. In a WiMAX communication system that is configured to engage in a plurality of ranging processes, wherein a pool of ranging codes is available to client devices for requesting the ranging processes, wherein the pool is divided into groups of ranging codes, wherein each group comprises ranging codes allocated for requesting a particular ranging process, a method for managing allocation of the ranging codes, the method comprising:

receiving a plurality of requests for ranging processes, wherein each request comprises a ranging code that is allocated for a particular ranging process;

using the ranging codes from the received requests as a basis for determining a quantity of received requests, respectively, for each ranging process;

determining that requests for one ranging process have been received more frequently than requests for another ranging process; and based, at least in part, on the determined quantity of received requests for at least one ranging process, adjusting the allocation of the ranging codes by re-allocating ranging codes from the group allocated for the less frequently requested ranging process to the group allocated for the more frequently requested ranging process.

2. The method of claim 1, wherein the requests are received during a predetermined period of time, and wherein the quantity of received requests, for each ranging process, respectively, comprises the quantity of received requests during the predetermined period of time.

3. The method of claim 1, wherein the ranging processes comprise an initial ranging process.

4. The method of claim 1, wherein the ranging processes comprise a periodic ranging process.

5. The method of claim 1, wherein the ranging processes comprise a bandwidth request process.

6. The method of claim 1, wherein the ranging processes comprise a handoff ranging process.

7. The method of claim 1, wherein the pool of ranging codes initially comprises 256 ranging codes, and wherein each group initially comprises 64 ranging codes.

8. The method of claim 1, wherein the ranging processes comprise initial ranging, periodic ranging, bandwidth adjustment, and handoff ranging.

9. The method of claim 1, wherein the ranging codes comprise orthogonal variable spreading factor (OVSF) ranging codes.

10. The method of claim 1, further comprising, broadcasting a ranging code allocation message, wherein the ranging code allocation message indicates which ranging codes are assigned to each group of ranging codes.

11. The method of claim 10, wherein the ranging code allocation message is a UL-MAP message or a DL-MAP message.

12. A WiMAX communication system that is configured to engage in a plurality of ranging processes, wherein a pool of ranging codes is available to client devices for requesting the ranging processes, wherein the pool is divided into groups of ranging codes, wherein each group comprises ranging codes allocated for requesting a particular ranging process, the system comprising:

a receiver that is configured to receive a plurality of requests from one or more client devices, wherein each request comprises a ranging code that is allocated for requesting a particular ranging process;

program code stored in data storage and executable by a processor to:

use the ranging codes from the requests as a basis to determine a quantity of requests received, respectively, for each ranging process;

determine that requests for one ranging process have been received more frequently than requests for another ranging process; and based, at least in part, on the determined quantity of received requests for at least one ranging process, adjust the allocation of the ranging codes via a re-allocation of one or more ranging codes from the group allocated for the less frequently requested ranging process to the group allocated for the more frequently requested ranging process.

13. The WiMAX communication system of claim 12, further comprising a transmitter configured to broadcast a ranging code allocation message, wherein the ranging code allocation message comprises one or more allocation codes, wherein each allocation code indicates a quantity of ranging codes allocated for requesting a particular ranging process.

14. The WiMAX communication system of claim 13, wherein the transmitter is configured to broadcast the ranging code allocation message in a downlink sub-frame.

15. The WiMAX communication system of claim 13, wherein the transmitter is configured to broadcast the ranging code allocation message in a DL-MAP message or UL-MAP message.

* * * * *